US012583982B2

(12) United States Patent
Yang et al.

(10) Patent No.: US 12,583,982 B2
(45) Date of Patent: Mar. 24, 2026

(54) POLYESTER FILM, HEAT-SHRINKABLE LABEL AND PACKAGING COMPRISING SAME

(71) Applicant: SK microworks Co., Ltd., Gyeonggi-do (KR)

(72) Inventors: Joo Ho Yang, Gyeonggi-do (KR); Chul Kyu Kim, Gyeonggi-do (KR); Yong Deuk Kim, Gyeonggi-do (KR); Seung Kyun Kim, Gyeonggi-do (KR)

(73) Assignee: Microworks Co., ltd., Chungcheongbuk-do (KR)

( * ) Notice: Subject to any disclaimer, the term of this patent is extended or adjusted under 35 U.S.C. 154(b) by 531 days.

(21) Appl. No.: 17/826,422

(22) Filed: May 27, 2022

(65) Prior Publication Data

US 2023/0002574 A1 Jan. 5, 2023

(30) Foreign Application Priority Data

Jul. 5, 2021 (KR) ........................ 10-2021-0087847

(51) Int. Cl.
*C08J 5/18* (2006.01)
*C08G 63/183* (2006.01)
(52) U.S. Cl.
CPC .............. *C08J 5/18* (2013.01); *C08G 63/183* (2013.01); *C08J 2367/03* (2013.01)
(58) Field of Classification Search
CPC ...... C08J 5/18; C08J 2367/03; C08J 2367/02; C08G 63/183; C08G 63/672; C08G 63/16;

(Continued)

(56) References Cited

U.S. PATENT DOCUMENTS 4,985,538 A 1/1991 Fukuda et al.
6,663,928 B2 12/2003 Ito et al.
(Continued)

FOREIGN PATENT DOCUMENTS

AU 2019226120 B2 11/2019
CA 2912355 C 2/2021
(Continued)

OTHER PUBLICATIONS

Office Action for New Zealand Patent Application No. 788935 issued by the New Zealand Intellectual Property Office on Jul. 9, 2024.

(Continued)

*Primary Examiner* — Randy P Gulakowski
*Assistant Examiner* — Holley Grace Hester
(74) *Attorney, Agent, or Firm* — IP & T GROUP LLP

(57) ABSTRACT

The polyester film according to the embodiment prepared while the crystallinity of a copolymerized polyester film is controlled can be improved in thermal properties and chemical properties. Specifically, the polyester film has not only an excellent shrinkage rate with respect to temperature, but also excellent adhesive strength by a solvent even when applied to gravure printing, UV curing printing, and VSOP printing, making it suitable for a heat shrinkage process and a seaming process. In addition, the polyester film can be applied to a recycling process since it has an appropriate change in crystals during washing with an aqueous solution of NaOH, and the generation of fusion is suppressed even upon prolonged high-temperature drying.

13 Claims, 8 Drawing Sheets

(58) Field of Classification Search

CPC ..... C08G 63/199; Y02W 30/80; B65D 65/38; G09F 3/02; G09F 2003/0272; C08K 3/36; C08K 5/523; C08L 67/02; C08L 2203/162

See application file for complete search history.

(56) References Cited

U.S. PATENT DOCUMENTS

| | | |
|---|---|---|
| 10,800,897 B2 | 10/2020 | Shin et al. |
| 2011/0224369 A1 | 9/2011 | Kim et al. |
| 2014/0162042 A1 | 6/2014 | Shih et al. |
| 2017/0021601 A1 | 1/2017 | Haruta et al. |
| 2018/0079877 A1 | 3/2018 | Ishimaru et al. |
| 2018/0162616 A1 | 6/2018 | Inoue et al. |
| 2019/0352032 A1 | 11/2019 | Kim et al. |
| 2021/0122899 A1 | 4/2021 | Kim et al. |
| 2022/0002477 A1* | 1/2022 | Kim ..................... B29C 48/08 |

FOREIGN PATENT DOCUMENTS

| | | | |
|---|---|---|---|
| EP | 1418042 | A1 | 5/2004 |
| EP | 1424188 | A1 | 6/2004 |
| EP | 1872935 | A1 | 1/2008 |
| EP | 2631261 | A2 | 8/2013 |
| EP | 3012286 | A2 | 4/2016 |
| EP | 3127682 | A1 | 2/2017 |
| EP | 3868813 | A1 | 8/2021 |
| EP | 2365025 | A1 | 9/2021 |
| KR | 2002-0062838 | A | 7/2002 |
| KR | 10-2016-0138545 | A | 12/2016 |
| KR | 10-2019-0125957 | A | 11/2019 |
| KR | 20210052313 | A * | 10/2020 |
| KR | 10-2021-0052313 | A | 5/2021 |
| WO | 01/12697 | A1 | 2/2001 |
| WO | 2009/111058 | A1 | 9/2009 |
| WO | 2020/076747 | A1 | 4/2020 |
| WO | 2021085938 | A1 | 5/2021 |

OTHER PUBLICATIONS

Office Action issued to the Korean Patent Application No. 10-2021-0087847 issued by the Korean Patent Office on Nov. 25, 2022.

Database WPI, Week 2021004, Thomson Scientific, AN 2021-47926A, XP002807966, 2017.

Extended European Search Report for the European Patent Application No. 22182967.4 issued by the European Patent Office on Nov. 23, 2022.

Champions for Change, Critical Issues Guidance for Innovations, Sleeve Label Substrate for PET Bottles Critical Guidance, Association of Postconsumer Plastic Recyclers, Jun. 18, 2012, pp. 1-20, APR, Washington D.C.

Third party observations for European Patent Application No. 22182967.4 issued by the European Patent Office on Dec. 2, 2024.

PET Flake Clumping Evaluation, PET-S-08, pp. 1-4, Nov. 1, 2022, The Association of Plastic Recyclers.

APR Full Sleeve Label Working Group-Final Report, pp. 1-62, Sep. 2014, The Association of Postconsumer Plastic Recyclers.

Patent Examination Report 2 for the New Zealand Patent Application No. 788935 issued by the New Zealand Intellectual Property Office on Feb. 5, 2025.

Office Action for Indian Patent Application No. 202214035755 issued by the Indian Patent Office (Intellectual Property India) on Jul. 31, 2025.

* cited by examiner (a)    (b)

POLYESTER FILM, HEAT-SHRINKABLE LABEL AND PACKAGING COMPRISING SAME

CROSS-REFERENCE TO RELATED APPLICATION(S)

This application claims benefit of priority to Korean Patent Application No. 10-2021-0087847 filed on Jul. 5, 2021 in the Korean Intellectual Property Office, the disclosure of which is incorporated herein by reference in its entirety.

TECHNICAL FIELD

Embodiments relate to a polyester film and to a heat-shrinkable label and a packaging material comprising the same. Specifically, the embodiments relate to a polyester film that can be recycled since its crystallinity is controlled and to a heat-shrinkable label and a packaging material that comprise the same and can be applied to various containers.

BACKGROUND ART

In recent years, as containers for beverages or foods are manufactured in various forms, or there are increased cases in which full packaging is applied in order to attract the attention of consumers, heat shrinkable labels and packaging materials are attracting attention. A heat shrinkable label or packaging material takes advantage of the feature of a polymer film that tends to shrink to a shape before stretching thereof at a certain temperature or higher once it has been oriented by stretching thereof. A typical process of labeling or packaging is carried out in which a heat shrinkable film is cut, printed in a desired design, rolled up, bonded at both ends with an adhesive solvent, loosely wrapped around a container, and then shrunk as heat is applied thereto.

A film used in the above heat shrinkage process is required to have not only such basic properties as thermal resistance, chemical resistance, weatherability, and printability, but also container sealability, heat shrinkage uniformity, sliding characteristics in the longitudinal direction, and crack resistance. Conventionally, polyvinyl chloride films, polystyrene films, polypropylene films, and the like have been used for this heat shrinkage process. In recent years, polyester films having such properties as high thermal resistance and weatherability, the convenience of incineration, and excellent printability have been widely used.

However, since a conventional polyester film has a fast shrinkage speed and a high shrinkage stress, there have been defects caused by non-uniform shrinkage or distortions of a plastic container. Thus, Korean Laid-open Patent Publication No. 2002-0062838 discloses a technique in which 5% by weight or more of a polyester elastomer is added to a heat shrinkable polyester film to suppress the generation of wrinkles, shrinkage stains, distortions, and the like when the film is used for full packaging of plastic bottles.

As such, polyester films used in the heat shrinkage process are prepared with lower crystallinity by blending a soft component with a polyester resin. In addition, they have been developed to have thermal properties such as shrinkage rate and shrinkage stress with respect to temperature, chemical resistance suitable for the seaming process, and recyclability that has recently emerged due to a waste plastic problem.

PRIOR ART DOCUMENT (Patent Document 1) Korean Laid-open Patent Publication No. 2002-0062838

DISCLOSURE OF INVENTION

Technical Problem

Since it is difficult to recycle heat shrinkable labels or packaging materials composed of a polyethylene terephthalate (PET) film despite their excellent thermal properties and chemical resistance, most of them are disposed of after use. This is because, when a PET film is introduced into the current recycling process, the PET film causes various process defects during a high-temperature process for a long period of time, resulting in an increase in costs. Or even if it is recyclable, there is a problem in that the seaming characteristics are poor due to the high crystallinity of a PET film when it is applied to the variable sleeve offset printing (VSOP) method.

Accordingly, the embodiments aim to provide a polyester film prepared while the crystallinity of a copolymerized polyester film is controlled to have excellent shrinkage characteristics and excellent seaming characteristics in various printing methods, without fusion even upon prolonged high-temperature drying in a recycling process, and a heat-shrinkable label and a packaging material comprising the same.

Solution to Problem

According to an embodiment, there is provided a polyester film, which comprises a polyester resin in which a diol comprising ethylene glycol and diethylene glycol; and a dicarboxylic acid are copolymerized, wherein the difference between the crystallization temperature $(T_c)$ and the melting temperature $(T_m)$ measured by a differential scanning calorimeter (DSC) is 100° C. or less, and the film has an endothermic peak at 100° C. to 150° C. when measured with a differential scanning calorimeter (DSC) upon treatment with a 1% aqueous solution of NaOH at 85° C. for 15 minutes.

According to another embodiment, there are provided a heat-shrinkable label and a packaging material comprising the polyester film.

Advantageous Effects of Invention

The polyester film according to the embodiment prepared while the crystallinity of a copolymerized polyester film is controlled can be improved in thermal properties and chemical properties. Specifically, it has not only an excellent shrinkage rate with respect to temperature, but also excellent adhesive strength by a solvent even when applied to gravure printing, UV curing printing, and VSOP printing, making it suitable for a heat shrinkage process and a seaming process. In addition, the polyester film can be applied to a recycling process since it has an appropriate change in crystals during washing with an aqueous solution of NaOH, and the occurrence of fusion is suppressed even upon prolonged high-temperature drying. Such crystal characteristics of the polyester film can be achieved in a desired range by controlling the components and contents of a copolymerized polyester resin constituting it and controlling the process conditions in the preparation process. Accordingly, the polyester film according to the embodiment can be advantageously applied as a heat shrinkable label or packaging material to containers of various products including beverages and foods.

BRIEF DESCRIPTION OF DRAWINGS

FIG. 8 shows a method of measuring the heat shrinkage of a polyester film in Test Example 6.

<Explanation of Reference Numerals>

Figure 1:
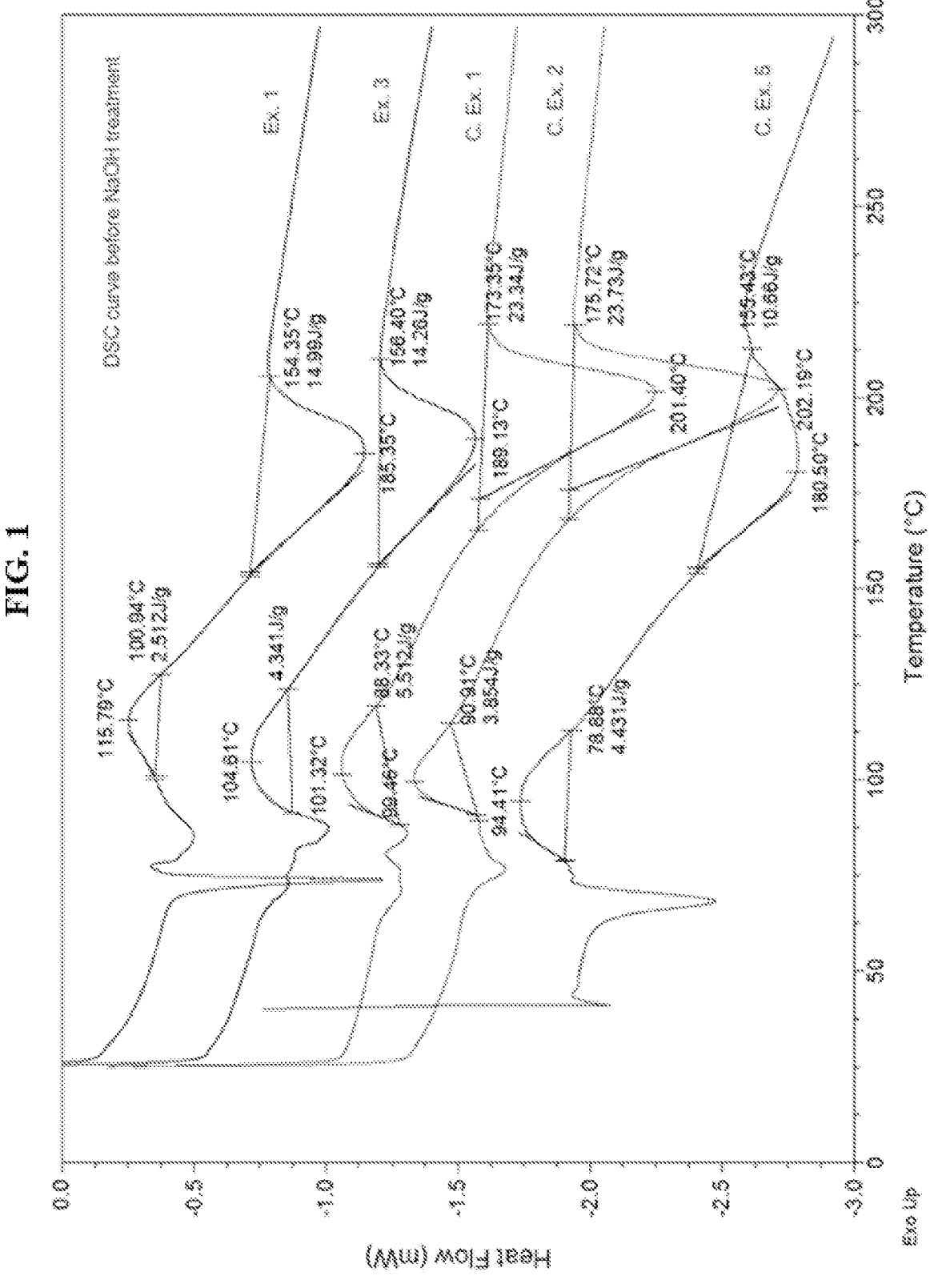
FIGS. 1 and 2 each show DSC curves before and after treatment of the polyester films with an aqueous solution of NaOH in Test Example 2.

1: label container
6: crusher
7: weight
8: sieve
10a: label flakes
10b: clumped label flakes
20a: container flakes
100: polyester film (before shrinkage)
100a; polyester film after shrinkage
110: adhesive part
120: pressing plate
130: weight
200: polyester film
300: sample
$T_g$: glass transition temperature
$C_{p1}$: first baseline
$C_{p2}$: second baseline
$\Delta C_p$: difference in heat capacity measured in a first scan
$\Delta C_p^o$: difference in heat capacity measured in a second scan
d: size of a hole
x1: first dimension before shrinkage
x2: first dimension after shrinkage
y: second dimension
w: spaced distance
$C_{total}$: heat flow curve of DSC
$C_{non-rev}$: non-reversible heat flow curve
$C_{rev}$: reversible heat flow curve

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them.

For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Characteristics of a Polyester Film

In the polyester film according to an embodiment, the difference ($T_m$–$T_c$) between the crystallization temperature and the melting temperature is controlled within a specific range.

As a thermal behavior of a polymer having crystallinity, it has a melting temperature (Tm), which is a temperature at which crystals are melted, and a crystallization temperature (Tc), which is a temperature at which crystals are formed. Thus, it is possible to adjust the thermal resistance of a polymer by adjusting its crystallinity. The measurement of the crystallization temperature and the melting temperature may be carried out by methods well known in the art. For example, differential scanning calorimetry (DSC) may be used.

The polyester film according to an embodiment has a crystallization temperature ($T_c$) and a melting temperature ($T_m$) measured by a differential scanning calorimeter (DSC), and the difference between the crystallization temperature (Tc) and the melting temperature (Tm) is 100° C. or less, specifically, less than 100° C. For example, $T_m$–$T_c$ may be 95° C. or less, 90° C. or less, or 85° C. or less, more specifically, 65° C. to 100° C., 75° C. to 100° C., or 80° C. to 100° C. The difference between the crystallization temperature and the melting temperature is directly related to the crystallization rate. Thus, when it is within the above preferred range, the crystallinity of the copolymerized polyester may be controlled such that the thermal properties and chemical properties of the polyester film are improved.

The differential scanning calorimeter (DSC) may be specifically a modulated differential scanning calorimeter (modulated DSC or MDSC), more specifically a temperature-modulated differential scanning calorimeter (TMDSC).

Figure 5:
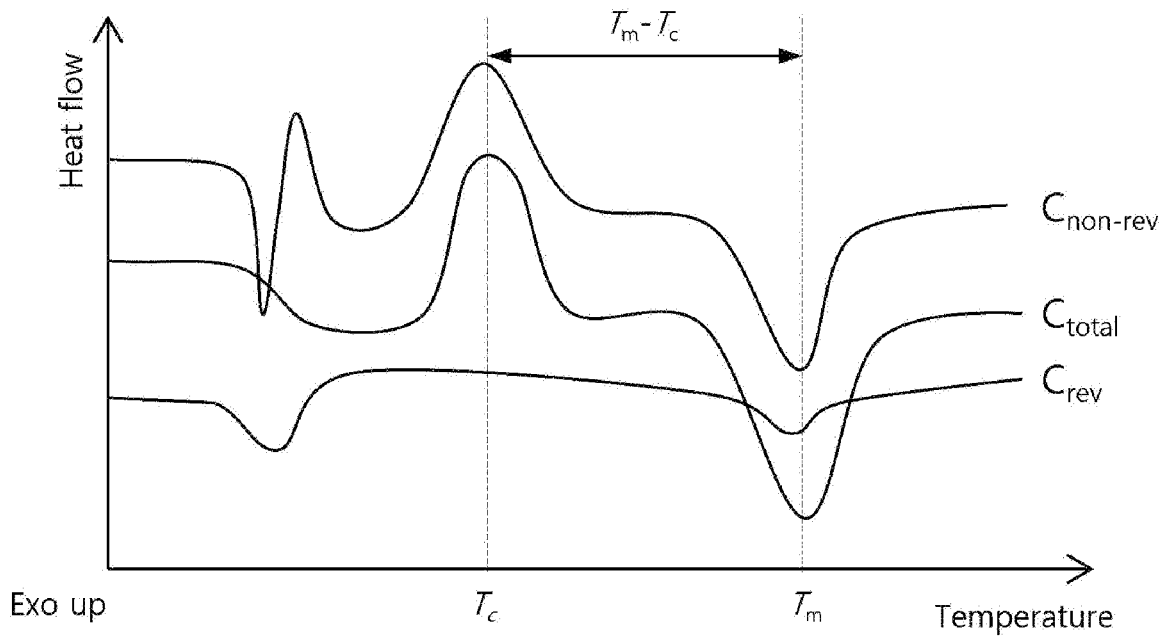
FIG. 5 shows a difference ($T_m$–$T_c$) between melting temperature and crystallization temperature in a DSC curve.

Referring to FIG. 5, it may be difficult to distinguish an endothermic peak and an exothermic peak in a heat flow curve ($C_{total}$) of a typical DSC. Thus, it is preferable to divide it into a non-reversible heat flow curve ($C_{non-rev}$) and a reversible heat flow curve ($C_{rev}$) for analysis. The reversible heat flow curve among them is suitable for obtaining a glass transition temperature (Tg). The non-reversible heat flow curve is suitable for obtaining a crystallization temperature ($T_c$) and a melting temperature ($T_m$).

In the non-reversible heat flow curve ($C_{non-rev}$) of DSC in FIG. 5, an exothermic peak appears at the crystallization temperature ($T_c$), and an endothermic peak appears at the melting temperature ($T_m$). The difference ($T_m$–$T_c$) between the crystallization temperature and the melting temperature of the polyester film can be obtained from the DSC curve.

The DSC scan for measuring the crystallization temperature and the melting temperature may be carried out specifically at a temperature elevation rate of 3° C./minute, which may be for obtaining a non-reversible heat flow curve.

In addition, the polyester film according to an embodiment may have crystal characteristics that allow ready recycling.

Figure 2:
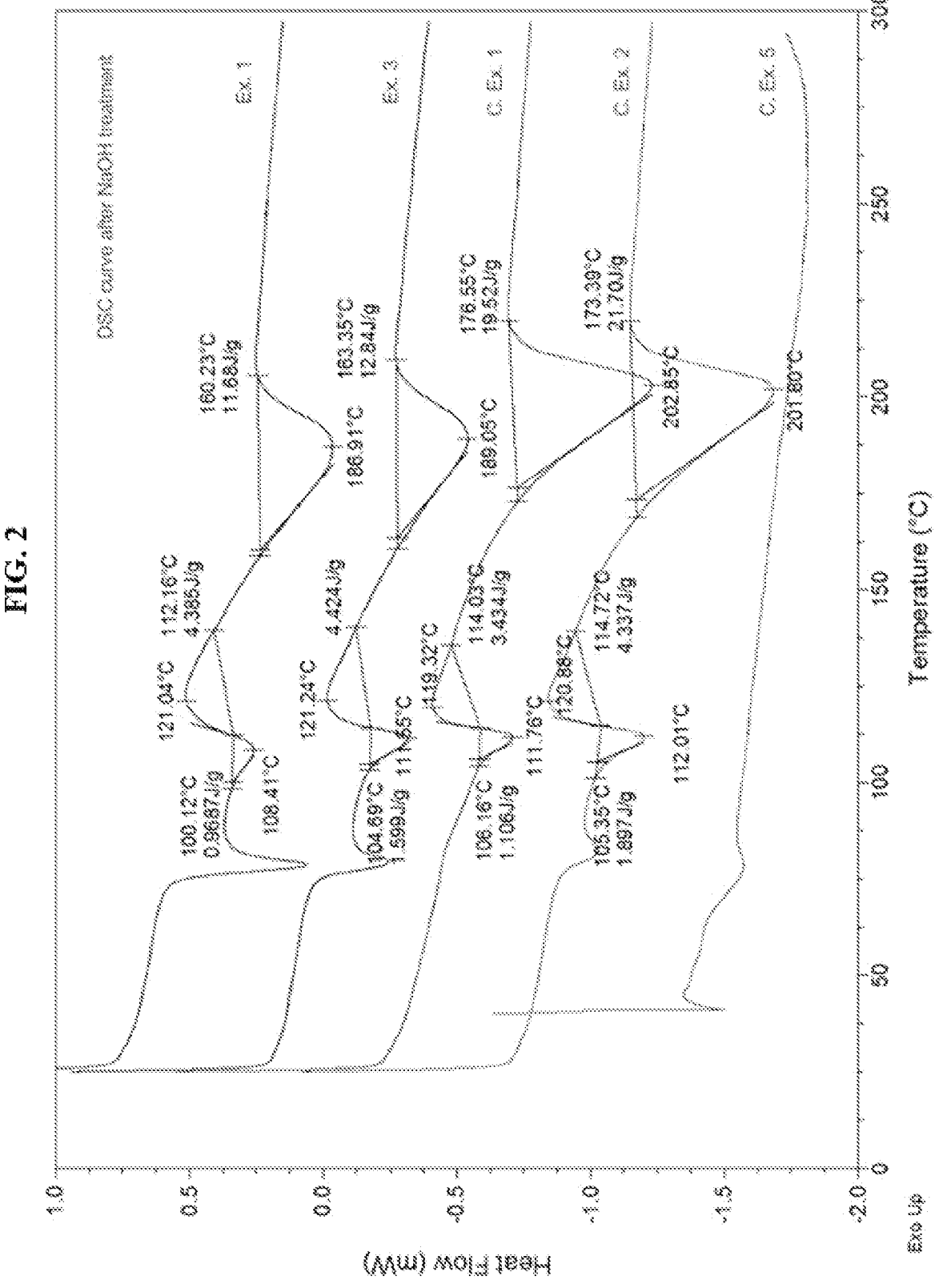

FIGS. 1 and 2 each show DSC curves (non-reversible heat flow curve) before and after treatment of the polyester films according to an embodiment with an aqueous solution. As shown in FIG. 2, the polyester films according to an embodiment have an endothermic peak, specifically, an apex of endothermic peak, at 100° C. to 150° C. when measured with a differential scanning calorimeter (DSC) upon treatment with a 1% aqueous solution of NaOH at 85° C. for 15 minutes. For example, the endothermic peak temperature ($T_{new}$) may be 100° C. to 140° C., 100° C. to 130° C., 100° C. to 120° C., or 100° C. to 115° C. In addition, the endothermic peak may have a melting enthalpy of 0.5 J/g to 10 J/g, specifically, 1 J/g to 5 J/g. The treatment with an aqueous solution of NaOH may be carried out by, for example, stirring the polyester film in a 1% aqueous solution of NaOH at 85° C. for 15 minutes at a speed of 240 m/minute. In addition, the DSC scan for measuring the endothermic peak may be carried out specifically at a temperature elevation rate of 10° C./minute, which may be for obtaining a non-reversible heat flow curve.

In addition, the difference between the endothermic peak temperature and the melting temperature may be 100° C. or less or 90° C. or less, for example, 40° C. to 100° C. Specifically, the difference ($T_m$–$T_{new}$) between the endothermic peak temperature and the melting temperature may be 50° C. to 90° C., more specifically, 75° C. to 85° C. In addition, the difference between the endothermic peak temperature and the crystallization temperature may be –10° C. to 10° C., specifically, –8° C. to 9° C.

As shown in FIG. 1, the endothermic peak is not observed at 100° C. to 150° C. before treatment with an aqueous solution of NaOH. That is, the polyester film according to an embodiment does not have an endothermic peak when measured with a differential scanning calorimeter (DSC) without treatment. It is understood from the above that the crystallinity of the polyester film is changed by treatment with an aqueous solution of NaOH.

The treatment with an aqueous solution of NaOH is carried out to remove impurities remaining in crushed flakes in the recycling process of plastic containers. The polyester film according to an embodiment may be changed to a more favorable crystalline state for recycling through such a washing procedure, which can be confirmed by whether or not a new endothermic peak appears.

In addition, the difference in heat capacity before and after the glass transition temperature (Tg) in a DSC curve is controlled in the polyester film.

The glass transition temperature (Tg) refers to a temperature at which a material, such as a polymer having an amorphous region, present in a hard and relatively brittle state like glass at low temperatures changes to have viscosity or to a rubber-like state when heated. It may be determined by methods well known in the art. For example, in a reversible heat flow curve or heat capacity curve by DSC, the baseline is kept constant and then steeply changes around a certain temperature where the height of the baseline changes, which temperature may be determined as a glass transition.

Figure 4:
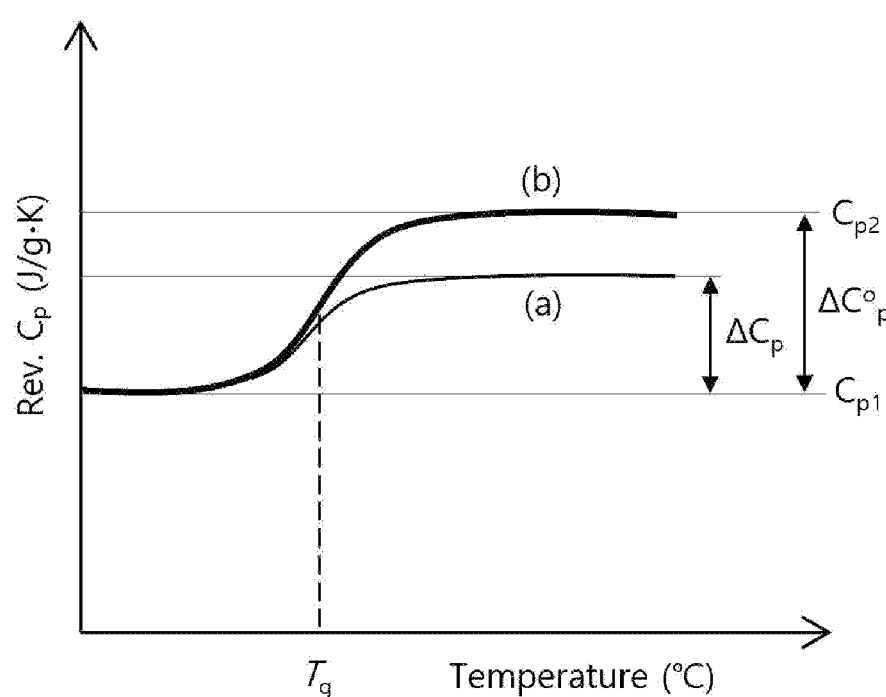
FIG. 4 shows a difference in heat capacity ($\Delta C^o_p$ and $\Delta C_p$) before and after Tg in a DSC curve of a polyester film.

Meanwhile, in a DSC curve of a polymer, the change in baseline is observed over a certain temperature section, not at a specific temperature. This is because the glass transition of the polymer takes place over a certain temperature section rather than at a specific temperature. Thus, the temperature where an inflection point (i.e., the position where the curve starts to change from a convex shape to a concave shape, or vice versa) appears in the section in which the baseline of a DSC curve changes may be determined as Tg. Specifically, as shown in FIG. 4, an inflection point in a section in which the DSC curve (b) changes from a first baseline ($C_{p1}$) to a second baseline ($C_{p2}$) may be defined as Tg.

Thus, the reversible heat capacity before Tg may be determined as a heat capacity corresponding to the baseline ($C_{p1}$) before the inflection point of the DSC curve (b), and the reversible heat capacity after Tg may be determined as a heat capacity corresponding to the baseline ($C_{p2}$) after the inflection point of the DSC curve (b). Thus, the difference in the reversible heat capacity before and after Tg may be calculated as the difference in heat capacity ($\Delta C^0_p$) corresponding to the difference in the baseline before and after the inflection point of the DSC curve.

Meanwhile, if a baseline is inclined in a DSC curve, the heat capacity difference can be calculated after the curve is corrected to be flat. In addition, in a DSC curve, it is also possible to calculate the difference in heat capacity corresponding to the intersection of the tangent at the inflection point and the tangent of each temperature section corresponding to 5° C. to 15° C. before or after the inflection point. Here, the tangent can be obtained by the least squares method.

The polyester film according to an embodiment may have a difference in reversible heat capacity ($\Delta C^0_p$) of 0.25 J/g·K or more before and after the glass transition temperature (Tg) as measured when it is subjected to first scan by a differential scanning calorimeter (DSC) from room temperature to 300° C. at a temperature elevation rate of 3° C./minute, followed by cooling thereof, and to second scan under the same conditions. Specifically, the difference in reversible heat capacity ($\Delta C^0_p$) may be 0.25 J/g·K to 0.5 J/g·K or 0.25 J/g·K to 0.4 J/g·K. As another example, the difference in reversible heat capacity ($\Delta C^0_p$) may be 0.3 J/g·K or more or 0.3 J/g·K to 0.45 J/g·K.

For the measurement of heat capacity, the polyester film is subjected to first scan from room temperature to 300° C. at a temperature elevation rate of 3° C./minute, followed by cooling thereof. The cooling may be specifically carried out by quenching. For example, the sample heated to a high temperature after the first scan may be put into a cooler of –10° C. to 0° C. for quenching. Thereafter, the cooled film is subjected to a second scan under the same conditions as those of the first scan, that is, a temperature elevation rate of 3° C./minute from room temperature to 300° C.

Referring to FIG. 4, the reversible heat capacity curve (a) obtained through the first scan by DSC and the reversible heat capacity curve (b) obtained through the second scan have some differences. This is because the second scan is carried out with the thermal history removed by the first scan and cooling procedures. The heat capacity measured through the first scan varies depending on the film composition as well as post-processing conditions such as stretching and heat-setting, whereas the heat capacity measured through the second scan once the thermal history has been removed is determined only by the inherent properties of the polymer constituting the film.

The difference in heat capacity before and after Tg in a reversible heat capacity curve obtained by DSC is related to the amorphous region in a film. The difference in heat capacity ($\Delta C_p$) before and after Tg obtained from the first scan curve may vary depending on the post-processing conditions of the film. Thus, the crystallinity of the film can be more directly controlled by adjusting the difference in heat capacity before and after Tg ($\Delta C^0_p$), obtained from the second scan curve after the first scan and cooling to remove the thermal history, to a specific range.

Meanwhile, the difference ($\Delta C_p$) in reversible heat capacity before and after the glass transition temperature (Tg) measured through the first scan may be 0.01 J/g·K to 0.4 J/g·K. Specifically, the difference ($\Delta C_p$) in reversible heat capacity before and after the glass transition temperature (Tg) measured through the first scan may be 0.05 J/g·K to 0.3 J/g·K, 0.05 J/g·K to 0.2 J/g·K, or 0.2 J/g·K to 0.3 J/g·K.

In addition, the difference between $\Delta C^0_p$ and $\Delta C_p$ ($|\Delta C^0_p - \Delta C_p|$) may be 0.01 J/g·K to 0.3 J/g·K. More specifically, the difference between $\Delta C^0_p$ and $\Delta C_p$ ($\Delta C^0_p - \Delta C_p$) may be 0.05 J/g·K to 0.13 J/g·K or 0.2 J/g·K to 0.3 J/g·K.

In addition, a percentage of $\Delta C_0^P$ to $\Delta C_p$, that is, $X_{ma}$ calculated from $\Delta C^0_p$ and $\Delta C_p$ by the following equation may be adjusted within a specific range.

$$X_{ma}(\%)=\Delta C_p(\text{J/g·K})/\Delta C^0_p(\text{J/g·K})\times 100$$

When the sum of the crystalline region, the mobile amorphous region, and the rigid amorphous region constituting the polyester film is 100%, $X_{ma}$ refers to a mobile amorphous fraction.

In the polyester film, $X_{ma}$ may be 20% or more or 30% or more, for example, 20% to 90% or 30% to 90%. Specifically, in the polyester film, $X_{ma}$ may be 40% or more, more specifically, 40% to 90%.

The crystallinity of the polyester film may also be confirmed by an X-ray diffraction (XRD) spectrum.

The crystal structure of a material may be identified by irradiating X-rays to the material using an XRD device and analyzing the reflected rays. Specifically, when X-rays are irradiated to a material, they collide with atoms, and the bounced X-rays are detected to obtain a graph of intensity with respect to diffraction angle to determine the crystal structure.

An amorphous region of a polyester film is observed as a peak near 200 in an XRD spectrum by an amorphous halo, and crystals formed by stretching or heating are observed as an inflection point near 25°.

Thus, the polyester film may have a maximum peak at a diffraction angle (20) of less than 25° in an X-ray diffraction (XRD) spectrum. For example, the diffraction angle of the maximum peak may be 15° or more to less than 25°, 20° or more to less than 25°, or 17° to 23°. Specifically, the maximum peak may be a maximum peak observed in a diffraction angle region of 100 to 400 in an XRD spectrum.

In addition, in the polyester film according to an embodiment, the shrinkage rate in the main shrinkage direction with respect to temperature may be adjusted within a specific range. For example, when the shrinkage rate in the main shrinkage direction of the polyester film upon thermal treatment at a temperature of X° C. for 10 seconds is defined as $T_X$, the ranges of $T_{70}$, $T_{75}$, $T_{80}$, $T_{90}$, and $T_{1000}$ may be adjusted. The thermal treatment for obtaining $T_X$ may specifically refer to immersing the polyester film in hot water at X° C. for 10 seconds.

The polyester film may have a $T_{70}$ of 0% to 30%, 0% to 20%, or 5% to 15%. The polyester film may have a $T_{75}$ of 0% to 40%, 5% to 40%, or 10% to 30%. The polyester film may have a $T_{80}$ of 10% to 60%, 20% to 50%, or 25% to 45%. The polyester film may have a $T_{90}$ of 30% to 90%, 40% to 80%, or 50% to 70%. The polyester film may have a $T_{100}$ of 40% to 90%, 50% to 85%, or 60% to 80%. That is, the polyester film may have a shrinkage rate of 60% to 80% in the main shrinkage direction upon thermal treatment at a temperature of 100° C. for 10 seconds.

The polyester film may have excellent adhesive strength by a solvent, specifically, an organic solvent.

As an example, once two sheets of the polyester film have been adhered by tetrahydrofuran (THF), the peel strength may be 200 gf/in or more. Specifically, the peel strength after adhesion by THF may be 300 gf/in or more, 350 gf/in or more, 400 gf/in or more, or 500 gf/in or more, and, more specifically, 300 gf/in to 2,000 gf/in or 300 gf/in to 1,000 gf/in.

As another example, once two sheets of the polyester film have been adhered by 1,3-dioxolane, the peel strength may be 200 gf/in or more, 500 gf/in or more, or 800 gf/in or more.

For example, once two sheets of the polyester film have been adhered by 1,3-dioxolane, the peel strength may be 1,000 gf/in or more. Specifically, the peel strength after adhesion by 1,3-dioxolane may be 1,100 gf/in or more, 1,300 gf/in or more, 1,500 gf/in or more, or 2,000 gf/in or more, and, more specifically, 1,000 gf/in to 4,000 gf/in or 1,000 gf/in to 3,000 gf/in.

The peel strength may be measured by, for example, a method in which a solvent is applied onto a polyester film, another sheet of the polyester film is laminated thereon, a pressure of 2 kgf is applied to the area where the solvent has been applied for 1 hour for aging, and the polyester films are then delaminated at a speed of 300 mm/minute and an angle of 180°. In addition, the solvent (e.g., organic solvent) may be applied in a width of 2 mm and a length of about 3 cm.

In addition, in the polyester film, a deterioration of seaming characteristics by a fountain solution mainly used for label printing may be minimized. A fountain solution is coated on the background area except for the area where an ink is in direct contact with the substrate when a label is printed. Since it is not well mixed with an ink like a relationship between water and oil, it allows the ink to be printed clearly without spreading. However, the film coated with such a fountain solution may prevent a solvent for seaming (1,3-dioxolane or the like) from reaching the surface of the substrate, thereby deteriorating the seaming characteristics Thus, it is preferable that the seaming characteristics at a certain level or more are achieved even after a fountain solution is coated on a substrate film as described above.

Specifically, when one sheet of the polyester film is coated with a glycol-based solution and is then adhered with another sheet of the polyester film by 1,3-dioxolane, the peel strength may be 500 gf/in or more. Specifically, the peel strength after coating of a glycol-based solution and adhesion by 1,3-dioxolane may be 700 gf/in or more, 900 gf/in or more, 1,100 gf/in or more, 1,300 gf/in or more, or 1,500 gf/in or more, and, more specifically, 500 gf/in to 3,000 gf/in or 900 gf/in to 2,000 gf/in. The glycol-based solution is a component mainly used in a fountain solution. For example, it may be an aqueous solution comprising 10% to 20% by weight of glycerol. In addition, it may comprise 5% to 10% by weight of malic acid, 5% to 10% by weight of 1-propoxy-propan-2-ol, and 1% by weight to 2.5% by weight of 2,2',2"-nitriletriethanol, and the like.

In addition, in the polyester film, clumping, which may take place in the high-temperature compression process of crushed flakes in a plastic recycling process may be suppressed. Clumping refers to an aggregate that may be formed in the regeneration process. The size of the aggregates may be, for example, at least three times the size of the flake particles before the thermal treatment. The clumping ratio refers to a ratio of the aggregates based on the total weight of the initial flakes, that is, the flakes before the thermal treatment. It may be calculated by the following equation.

$$\text{Clumping ratio (\%)}=\text{weight of aggregated flakes}/\text{weight of initial flakes}\times 100$$

In the regeneration process of a polyethylene terephthalate (PET) container in which a film is provided as a label, the flakes obtained by crushing them are passed through a sieve and then subjected to a thermal treatment process. In such an event, aggregates may be formed as the crushed flakes are clumped, which aggregates are called clumping. The aggregates are again filtered through a sieve, and the weight is measured. The weight ratio of the aggregates based on the total weight of the flakes before the thermal treatment is calculated as a clumping ratio. Thus, the higher the value of the clumping ratio, the lower the recyclability.

Specifically, when the polyester film according to an embodiment is crushed to a particle size of 9.5 mm to 12 mm, thermally treated at a temperature of 210° C. under a load of 2.5 kgf for 90 minutes, and passed through a sieve having a hole size of 12.5 mm, the ratio that does not pass may be 5% or less. More specifically, the ratio that does not pass through the sieve may be very small such as 3% or less, 2% or less, or 1% or less. This is attributable to the adjustment of crystallinity of the polyester film whereby fusion is suppressed under high-temperature conditions.

If plastic flakes are fused in the regeneration process, it may cause various problems. Thus, the U.S. Association of Plastic Recyclers (APR) is preparing a procedure (APR PET-S-08) to evaluate a clumping ratio. Specifically, when 3 parts by weight of a polyester film and 97 parts by weight of a polyethylene terephthalate container are crushed to a particle diameter of 9.5 mm to 12 mm, respectively, thermally treated for 90 minutes at a temperature of 210° C. under a pressure of 8.7 kPa (i.e., a load of 2.5 kgf applied to a cylinder having a diameter of 6 cm), and passed through a sieve having a hole size of 12.5 mm, the clumping ratio may refer to the ratio that does not pass.

Composition of a Polyester Film

The polyester film according to an embodiment comprises a copolymerized polyester resin.

For example, the copolymerized polyester resin may be one in which two or more diols and a dicarboxylic acid are copolymerized. Specifically, the copolymerized polyester resin may be one in which a diol comprising ethylene glycol and ethylene glycol and a dicarboxylic acid are copolymerized. More specifically, the copolymerized polyester resin may be one in which three or more diols and a dicarboxylic acid are copolymerized.

The diol component may comprise an aliphatic diol, an alicyclic diol, an aromatic diol, or a derivative thereof. The aliphatic diol may be, for example, an aliphatic diol having 2 to 10 carbon atoms, and it may have a linear or branched structure.

As a specific example, the aliphatic diol may comprise ethylene glycol, diethylene glycol, neopentyl glycol, 1,3-propanediol, 1,2-octanediol, 1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, 1,6-hexanediol, 2-ethyl-3-methyl-1,5-hexanediol, 2-ethyl-3-ethyl-1,5-hexanediol, 1,7-heptanediol, 2-ethyl-3-methyl-1,5-heptanediol, 2-ethyl-3-ethyl-1,6-heptanediol, 1,8-octanediol, 1,9-nonanediol, 1,10-decanediol, a derivative thereof, or any combination thereof.

The dicarboxylic acid may comprise an aromatic dicarboxylic acid, an aliphatic dicarboxylic acid, an alicyclic dicarboxylic acid, or an ester thereof.

For example, the dicarboxylic acid may be terephthalic acid, dimethylterephthalic acid, isophthalic acid, naphthalene dicarboxylic acid, orthophthalic acid, adipic acid, azelaic acid, sebacic acid, decanedicarboxylic acid, an ester thereof, or a combination thereof. Specifically, the dicarboxylic acid may comprise at least one selected from the group consisting of terephthalic acid, dimethyl terephthalate, naphthalene dicarboxylic acid, and orthophthalic acid.

According to an embodiment, the copolymerized polyester resin may be one in which two or more diols and an aromatic dicarboxylic acid are copolymerized. According to another embodiment, the copolymerized polyester resin may be one in which three or more diols and an aromatic dicarboxylic acid are copolymerized. According to still another embodiment, the copolymerized polyester resin may be one in which a diol comprising ethylene glycol and at least one comonomer and an aromatic dicarboxylic acid are copolymerized. According to still another embodiment, the copolymerized polyester resin may be one in which a diol comprising ethylene glycol and at least two comonomers and an aromatic dicarboxylic acid are copolymerized.

The diol may comprise ethylene glycol in an amount of 50% by mole to 90% by mole based on the total number of moles of the diol. For example, the diol may comprise ethylene glycol in an amount of 60% by mole to 90% by mole, 63% by mole to 85% by mole, or 65% by mole to 83% by mole, based on the total number of moles of the diol.

The diol may comprise the comonomer in an amount of 10% by mole to 50% by mole based on the total number of moles of the diol. For example, the diol may comprise the comonomer in an amount of 10% by mole to 40% by mole, 15% by mole to 37% by mole, or 17% by mole to 35% by mole, based on the total number of moles of the diol.

The diol may comprise, as a comonomer, the diols except for ethylene glycol among the diols exemplified above.

For example, the diol may comprise, as a comonomer, diethylene glycol, 1,4-cyclohexanedimethanol, 1,3-propanediol, 1,2-octanediol, 1,3-octanediol, 2,3-butanediol, 1,3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a combination thereof. Specifically, the comonomer among the diol may comprise at least one selected from the group consisting of neopentyl glycol, cyclohexanedimethanol, and diethylene glycol.

The diol may comprise diethylene glycol as a comonomer. The content of diethylene glycol in the diol may be 1% by mole to 15% by mole, for example, 1% by mole to 10% by mole, 1% by mole to 7% by mole, 1% by mole to 5% by mole, or 1.5% by mole to 3% by mole.

In addition, the diol may comprise, as a comonomer, at least one of neopentyl glycol and cyclohexanedimethanol. The content of comonomer in the diol may be 1% by mole or more, 10% by mole or more, 20% by mole or more, 21% by mole or more, or 25% by mole or more, and 50% by mole or less, 40% by mole or less, or 30% by mole or less. For example, the content of comonomer in the diol may be 1% by mole to 50% by mole, specifically, 10% by mole to 40% by mole, 10% by mole to 30% by mole, 20% by mole to 40% by mole, 20% by mole to 30% by mole, 20% by mole to 25% by mole, or 25% by mole to 30% by mole. More specifically, the diol may further comprise at least one comonomer selected from neopentyl glycol and cyclohexanedimethanol in an amount of 20% by mole to 30% by mole.

Specifically, the diol may comprise, as a comonomer, at least one selected from neopentyl glycol and cyclohexanedimethanol; and diethylene glycol.

As an example, the diol may comprise, as a comonomer, at least one selected from neopentyl glycol and cyclohexanedimethanol in an amount of 20% by mole to 30% by mole; and diethylene glycol in an amount of 1% by mole to 15% by mole.

The dicarboxylic acid may comprise terephthalic acid or dimethyl terephthalic acid in an amount of 80% by mole or more, 90% by mole or more, or 95% by mole or more, based on the total number of moles of the dicarboxylic acid. In addition, the dicarboxylic acid may comprise almost no isophthalic acid. For example, the content of isophthalic acid in the dicarboxylic acid may be 5% by mole or less, 3% by mole or less, or 1% by mole or less.

Specifically, the diol may comprise, as a comonomer, at least one selected from the group consisting of neopentyl glycol, cyclohexanedimethanol, and diethylene glycol in an amount of 20% by mole to 40% by mole or greater than 21% by mole to 40% by mole, and the content of isophthalic acid in the dicarboxylic acid may be less than 1% by mole.

As a specific example, the copolymerized polyester resin may be a glycol-modified polyethylene terephthalate (PETG).

The copolymerized polyester resin may further comprise an alcohol other than the diol, for example, a monohydric alcohol. For example, the monohydric alcohol may be methanol, ethanol, isopropanol, allyl alcohol, or benzyl alcohol. Specifically, the copolyester resin may comprise the monohydric alcohol in an amount of 10 parts by weight to 40 parts by weight or 15 parts by weight to 30 parts by weight based on 100 parts by weight of the diol.

Process for Preparing a Polyester Film

The polyester film according to an embodiment may be prepared by a process, which comprises preparing a copolymerized polyester resin; melting and casting the copolymerized polyester resin to obtain a film; and preheating and stretching the cast film and then heat-setting it.

Here, the composition and process conditions are adjusted such that the polyester film finally produced by the above process satisfies the characteristics (shrinkage characteristics and the like) as described above. Specifically, in order for the final polyester film to satisfy the characteristics as discussed above, the composition of the copolymerized polyester resin is adjusted, the extrusion and casting temperatures of the copolymerized polyester resin are adjusted, the preheating temperature, the stretching ratio in each direction, the stretching temperature, the stretching speed, and the like at the time of stretching are adjusted, or thermal treatment and relaxation is carried out after stretching while the thermal treatment temperature and relaxation rate are adjusted.

Hereinafter, each step will be described in more detail.

The copolymerized polyester resin may be prepared through a conventional transesterification reaction and polycondensation reaction. In such an event, the components and contents of the diol and dicarboxylic acid used are as exemplified above.

Thereafter, the copolymerized polyester resin may be melted at a temperature of 260° C. to 300° C. or 270° C. to 290° C. and then extruded and cast to obtain a film.

The cast film may be conveyed at a speed of 10 m/minute to 110 m/minute or 50 m/minute to 90 m/minute to pass through a roll and then preheated.

The preheating may be carried out, for example, at 90° C. to 120° C. for 0.01 minute to 1 minute. Specifically, the preheating temperature may be 95° C. to 115° C. or 97° C. to 113° C., and the preheating time may be 0.05 minute to 0.5 minute or 0.08 minute to 0.2 minute, but they are not limited thereto.

Thereafter, the film may be stretched in a first direction. For example, the stretching may be carried out at a temperature lower than the preheating temperature by at least 20° C. in a first direction by 3 times to 5 times. Specifically, the stretching may be carried out at a stretching temperature of 60° C. to 90° C., 70° C. to 90° C., or 75° C. to 85° C., in a first direction by 3 times to 4.5 times, 3.5 times to 4.5 times, or 4 times to 4.5 times, but it is not limited thereto. The stretching may be further carried out in a second direction perpendicular to the first direction. For example, it may be carried out in a second direction at a stretching ratio of 1.1 times to 2 times, specifically, 1.1 times to 1.5 times, as needed.

After stretching, the film may be heat-set. For example, it may be carried out at 70° C. to 95° C. for 0.01 minute to 1 minute. For example, the heat-setting temperature may be 75° C. to 95° C., 75° C. to 90° C., 80° C. to 90° C., 85° C. to 95° C., or 85° C. to 90° C., and the heat-setting time may be 0.05 minute to 0.5 minute or 0.08 minute to 0.2 minute. But they are not limited thereto.

Specifically, the difference between the preheating temperature and the heat-setting temperature may be 10° C. to 40° C., more specifically, 110° C. to 35° C., 13° C. to 34° C., 15° C. to 34° C., or 20° C. to 30° C.

Effects and Uses

The polyester film according to an embodiment prepared while the crystallinity of a copolymerized polyester film is controlled is improved in thermal properties and chemical properties. Specifically, it has not only an excellent shrinkage rate with respect to temperature, but also excellent adhesive strength by a solvent even when applied to gravure printing, UV curing printing, and VSOP printing, making it suitable for a heat shrinkage process and a seaming process. In addition, the polyester film can be applied to a recycling process since it has an appropriate change in crystals during washing with an aqueous solution of NaOH, and the generation of fusion is suppressed even upon prolonged high-temperature drying. In addition, such crystal characteristics of the polyester film can be achieved in a desired range by controlling the components and contents of a copolymerized polyester resin constituting it and controlling the process conditions in the preparation process.

Accordingly, the polyester film according to an embodiment can be advantageously applied as a heat shrinkable label or packaging material to containers of various products including beverages and foods. The heat shrinkable label or packaging material according to an embodiment comprises the polyester film, and it may further comprise a printing layer, a dye, an adhesive, or the like.

MODE FOR THE INVENTION

Hereinafter, the present invention is explained in detail by Examples. The following Examples are intended to further illustrate the present invention without limiting its scope.

Examples and Comparative Examples: Preparation
of a Polyester Film (1) Preparation of a Copolymerized Polyester Resin An autoclave equipped with a stirrer and a distillation column was charged with terephthalic acid as a dicarboxylic acid and ethylene glycol and a comonomer at a molar ratio shown in Table 1 below as a diol. 0.07 part by weight of manganese acetate as a transesterification catalyst was added thereto relative to the weight of the dicarboxylic acid, followed by heating the mixture to 220° C. and the removal of methanol produced as a byproduct to carry out the reaction.

Upon completion of the transesterification reaction, 0.07 part by weight of silica having an average particle diameter of 0.28 m was added per 100 parts by weight of the dicarboxylic acid, and 0.4 part by weight of trimethyl phosphate as a stabilizer was added. After 5 minutes, 0.035 part by weight of antimony trioxide and 0.005 part by weight of tetrabutylene titanate were added as a polymerization catalyst, followed by stirring for 10 minutes. Subsequently, the reaction mixture was transferred to a second reactor equipped with a vacuum apparatus. The pressure was gradually reduced while the temperature was raised to 285° C., and the polymerization was carried out for about 210 minutes to thereby prepare a composition comprising a copolymerized polyester resin.

(2) Preparation of a Film

The composition comprising a copolymerized polyester resin obtained in step (1) was extruded through a T-die at 270° C. and then cooled to thereby obtain an unstretched sheet. The unstretched sheet was passed through a roll while it was conveyed at a speed of 55 m/minute to thereby adjust the thickness thereof. Specifically, the unstretched sheet was preheated at 100 to 110° C. for 0.1 minute while it was conveyed at a speed of 55 m/minute and stretched 4 to 4.5 times in the transverse direction (TD) at a temperature lower than that by at least 20° C. The stretched sheet was thermally treated at a temperature shown in Table 1 below for 0.1 minute to prepare a polyester film having a thickness of 40 μm.

TABLE 1

| | Comonomer content (% by mole) | | | Stretching ratio | Heat-setting temp. |
|---|---|---|---|---|---|
| | NPG | CHDM | DEG | TD | (° C.) |
| Ex. 1 | 26 | — | 5 | 4.5 | 70 |
| Ex. 2 | 24 | — | 5 | 4.5 | 70 |
| Ex. 3 | 92 | — | 1.5 | 4.5 | 70 |
| Ex. 4 | 20 | — | 5 | 4.5 | 70 |
| C. Ex. 1 | 18 | — | 1.5 | 4.5 | 70 |
| C. Ex. 2 | 16 | — | 5 | 4.5 | 70 |
| C. Ex. 3 | 14 | — | 1.5 | 4.5 | 70 |
| C. Ex. 4 | — | 20 | 10 | 4.5 | 70 |
| C. Ex. 5 | — | 22 | 9 | 4.5 | 70 |

NPG: neopentyl glycol,
CHDM: 1,4-cyclohexanedimethanol,
DEG: diethylene glycol

Test Example 1: DSC Analysis 10-20 mg of a sample of the polyester film was placed in a differential scanning calorimeter (DSC; Q2000, manufacturer: TA Instruments), which was scanned in a modulated differential scanning calorimeter (MDSC) mode from room temperature to 300° C. at a temperature elevation rate of 3° C./minute with a temperature modulation of ±0.447° C. every 60 seconds.

The inflection point around which the baseline changed in the reversible heat capacity curve of DSC was determined as Tg. The difference in reversible heat capacity before and after Tg was calculated. In this test example, DSC analysis was carried out as a procedure of first scanning and then quenching to remove the thermal history, followed by second scanning.

Referring to FIG. 4, the difference $(\Delta C_p)$ of the reversible heat capacity before and after Tg was calculated from the reversible heat capacity curve (a) obtained by first scanning a sample of the polyester film by DSC. Thereafter, the sample of the first scanned polyester film was quenched at −5° C. to obtain a sample from which the thermal history was removed. The sample from which the thermal history had been removed was subjected to second scan by DSC, and the difference $(\Delta C^0_p)$ of the reversible heat capacity before and after Tg was calculated from the reversible heat capacity curve (b).

In addition, referring to FIG. 5, the crystallization temperature $(T_c)$ and the melting temperature $(T_m)$ were obtained from the non-reversible heat capacity curve of DSC, and their difference $(T_m-T_c)$ was calculated. The results are shown in Table 2 below and FIG. 1.

Test Example 2: New Endothermic Peak 4-5 mg of a sample of the polyester film was placed in a differential scanning calorimeter (DSC; Q2000, manufacturer: TA Instruments), which was scanned from 25° C. to 300° C. at a temperature elevation rate of 10° C./minute.

First, a non-reversible heat flow curve (curve before NaOH treatment) of the polyester film without any treatment was obtained. The polyester film was placed in a 1 wt % aqueous solution of NaOH, stirred at 85° C. at a speed of 240 m/minute (about 1,000 rpm) for 15 minutes, and then taken out to obtain a non-reversible heat flow curve of DSC (curve after NaOH treatment). It was observed whether there was a new endothermic peak between 100° C. and 150° C. in the curve after NaOH treatment as compared with the curve before NaOH treatment. Here, an endothermic peak having a melting enthalpy of 1 to 5 J/g between 100 and 150° C. was qualified as a new endothermic peak.

The results before NaOH treatment are shown in FIG. 1. The results after NaOH treatment are shown in Table 2 below and FIG. 2.

Test Example 3: XRD Analysis

Figure 3:
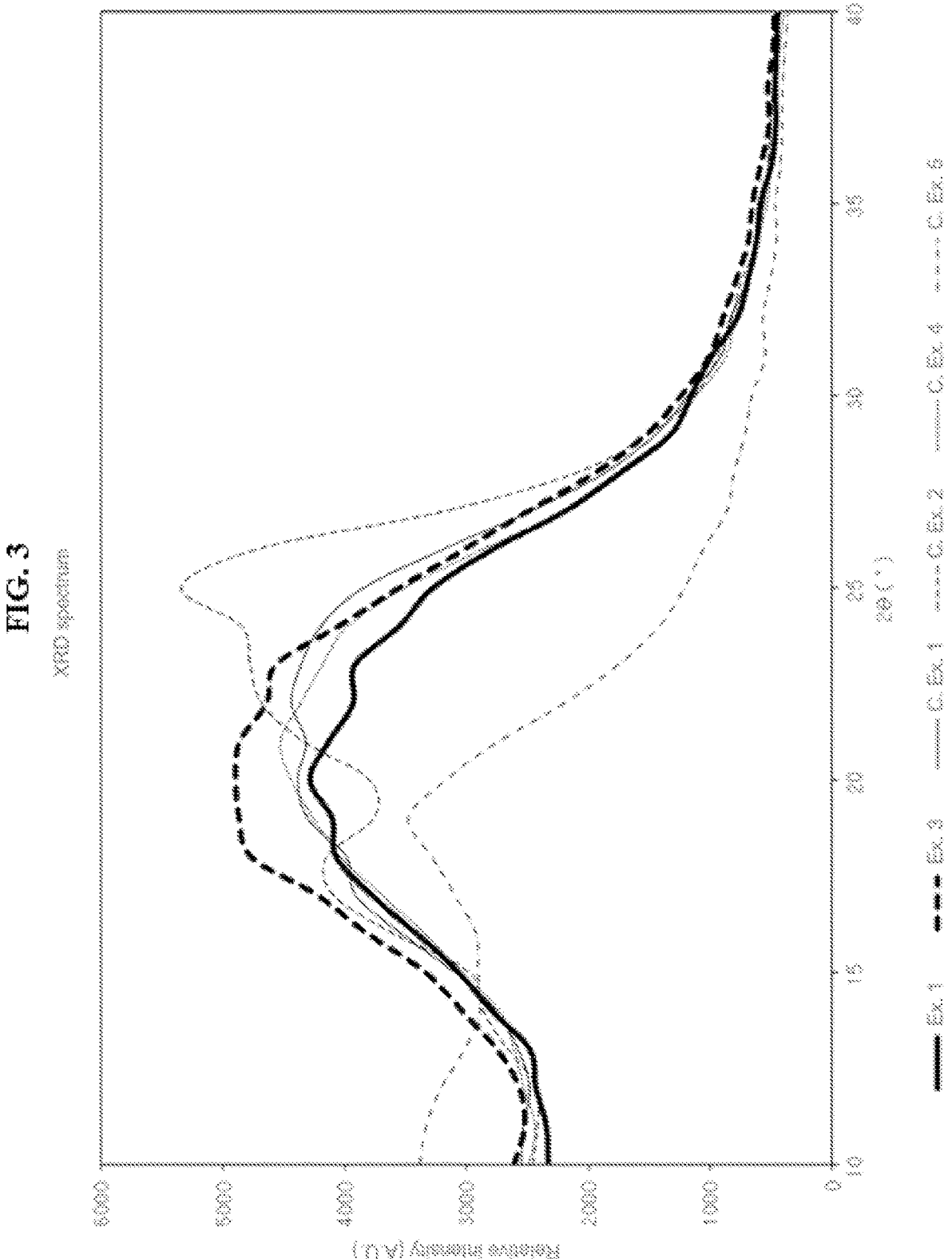
FIG. 3 shows X-ray diffraction (XRD) spectra of the polyester films in Test Example 3.

A spectrum of the polyester film was obtained using X-ray-diffraction analysis (XRD) equipment, and the diffraction angle (2θ) of the peak having a maximum intensity at 10° to 40° was confirmed. The results are shown in Table 2 below and FIG. 3.

TABLE 2

| | $\Delta C_P^0$ (J/g° C.) | $T_m - T_c$ (° C.) | $T_{new}$ (° C.) | $T_m - T_{new}$ (° C.) | 2θ (°) |
|---|---|---|---|---|---|
| Ex. 1 | 0.34 | 69.56 | 108.41 | 76.94 | 20 |
| Ex. 2 | 0.33 | 76.23 | 110 | 77.47 | 20 |
| Ex. 3 | 0.30 | 84.52 | 111.55 | 77.58 | 21 |
| Ex. 4 | 0.27 | 88.56 | 112 | 79.38 | 21 |
| C. Ex. 1 | 6.22 | 100.08 | 111.76 | 89.64 | 22 |
| C. Ex. 2 | 0.20 | 102.73 | 112.01 | 90.18 | 25 |
| C. Ex. 3 | 0.19 | 105.13 | 111 | 92.7 | 25 |
| C. Ex. 4 | 0.28 | 87.86 | — | — | 20 |
| C. Ex. 5 | 0.31 | 86.09 | — | — | 19 |

As can be seen from Table 2, in the films of Examples 1 to 4, the values of $\Delta C^0_p$, $T_m-T_c$, and 2θ were all within the preferred ranges, and a new endothermic peak was observed at 100 to 150° C. after treatment with an aqueous solution of NaOH.

Test Example 4: Solvent Adhesion (Seaming Characteristics)

Figure 6:
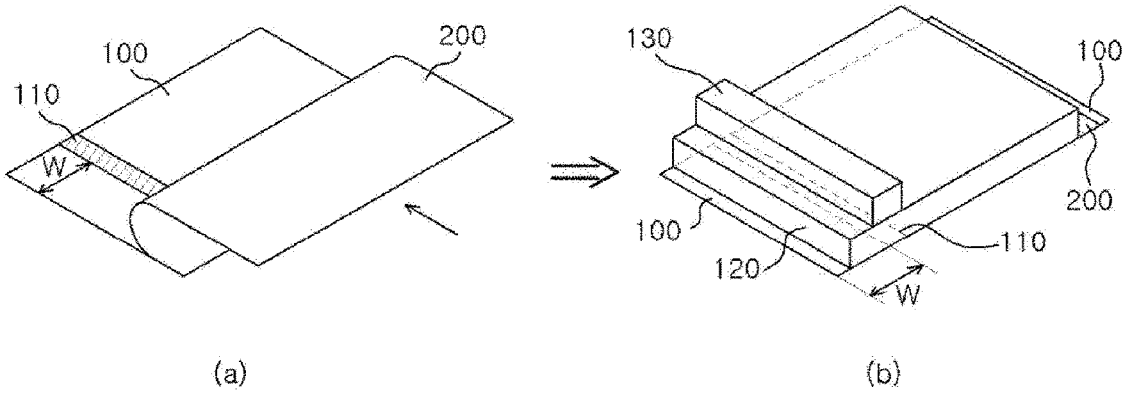
FIG. 6 shows a method of measuring the adhesive strength of a polyester film by a solvent in Test Example 4.
Figure 6:
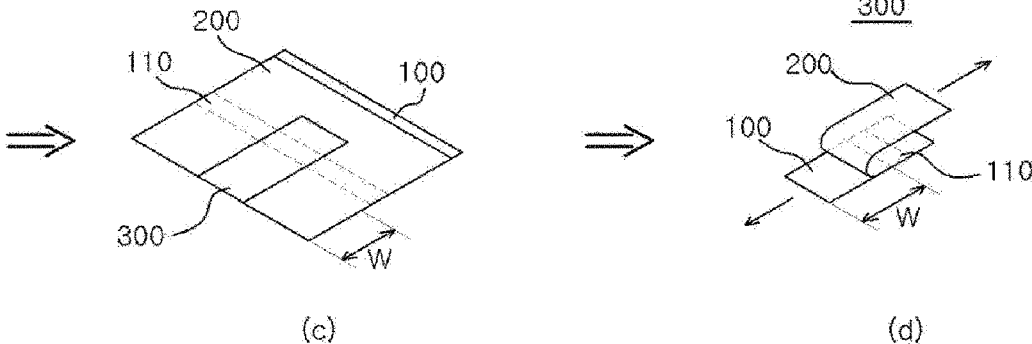

FIG. 6 shows a method of measuring the peel strength of a polyester film. That is, FIG. 6 shows a method of testing the seaming characteristics of a polyester film as adhesive strength by a solvent. Specifically, first, two sample sheets (i.e., a first polyester film and a second polyester film) were each prepared in A4 size. Thereafter, while 1,3-dioxolane was applied to one side of the first polyester film (100) in the form of a band having a width of 2 mm and a length of 30 mm to form an adhesive part (110), the second polyester film (200) was laminated on the first polyester film on which the adhesive part had been formed (see FIG. 6(*a*)). Here, the adhesive part (110) was formed at a position distanced by 6.5 cm (w) from the upper end of the first polyester film (100). In addition, the area of the adhesive part (110) was 60 mm². Thereafter, in order to prevent the first polyester film and the second polyester film laminated from bending, a pressing plate (120) was placed on the second polyester film. Thereafter, a weight (130) of 2 kg was placed on the pressing plate (120) and aged for 1 hour (see FIG. 6(*b*)). Here, the weight (130) was placed at the position of the adhesive part (110). Thereafter, the weight (130) and the pressing plate (120) were removed, and the first polyester film and the second polyester film laminated were cut into a width of 3 cm and a length of 9 cm to obtain a sample (300)(see FIG. 6(*c*)). Thereafter, when the first polyester film (100) and the second polyester film (200) in the sample (300) were delaminated at a speed of 300 mm/minute and an angle of 180°, the maximum force was measured as peel strength (see FIG. 6(*d*)). The test described above was carried out 5 times, and the average value is shown in Table 3 below.

In addition, in order to check the change in solvent adhesion by a fountain solution, a glycol-based fountain solution (Sunfount 411, SunChemical, Inc.) was coated on the surface of a second polyester film (200). The above solvent adhesion measurement procedure was repeated.

The solvent adhesion before the coating of the fountain solution and the solvent adhesion after the coating thereof are shown in Table 3 below.

Test Example 5: Clumping Ratio

The clumping ratio (%) was measured according to the procedure for polyethylene terephthalate flake clumping evaluation (APR PET-S-08) of the U.S. Association of Plastic Recyclers (APR).

Figure 7:
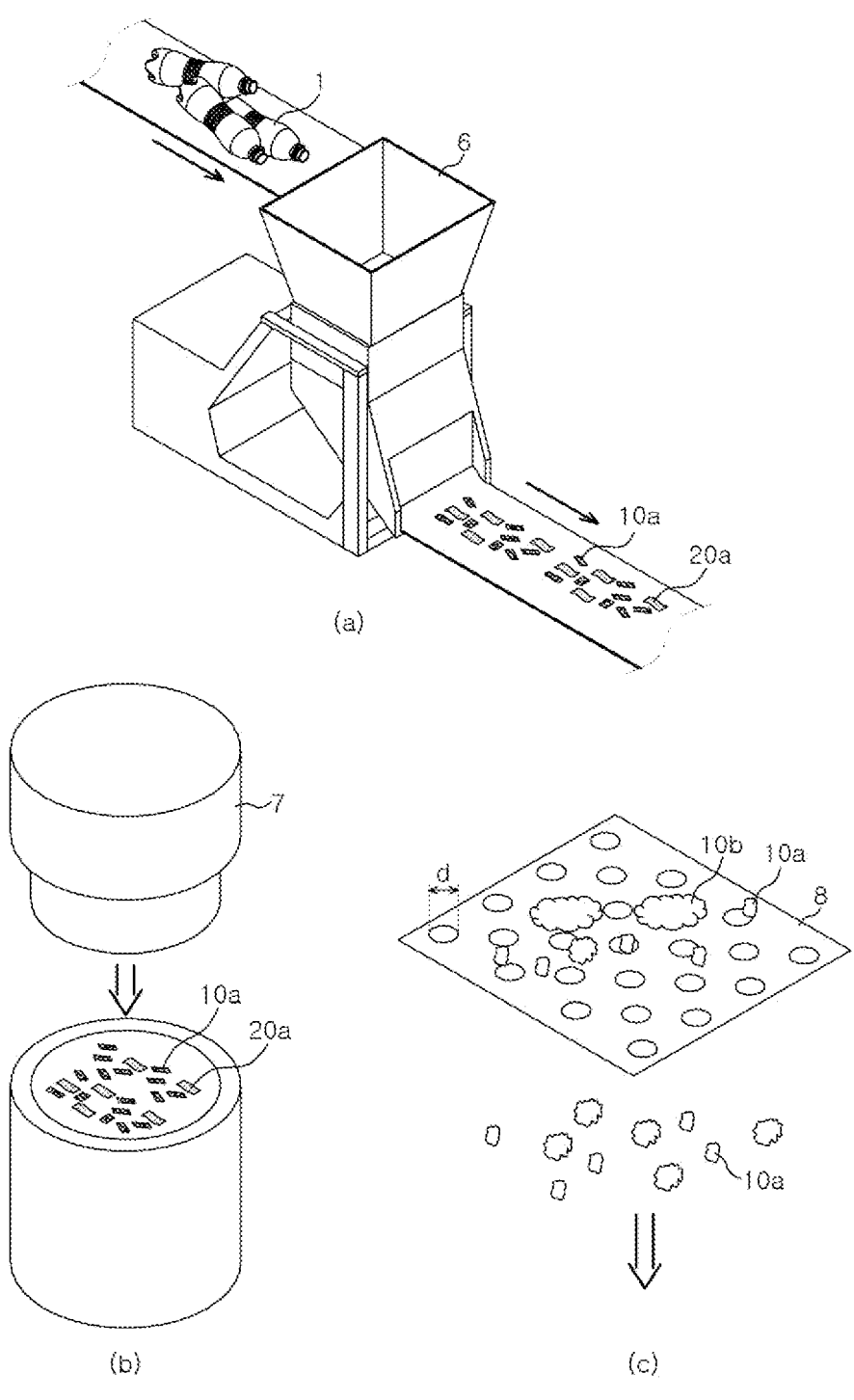
FIG. 7 shows a method of measuring the clumping ratio of a polyester film in Test Example 5.

FIG. 7 shows a method of measuring the clumping ratio of a polyester film.

As shown in FIG. 7(*a*), an article (1) in which a polyester film was provided as a label in a PET container was crushed in a crusher (6) and passed through a first sieve (not shown) having a hole size is 9.5 to 12 mm to obtain mixed flakes composed of 97 g of flakes (20*a*) obtained by crushing the PET container and 3 g of flakes (10*a*) obtained by crushing the polyester film label.

As shown in FIG. 7(*b*), the mixed flakes were placed on a cylinder having a diameter of 6 cm and a height of 8 cm, and a weight (7) of 2.5 kg was placed thereon to apply a load of 8.7 kPa. Thereafter, the cylinder with the weight thereon was dried in a convection oven at 210° C. for 90 minutes and then cooled at room temperature.

As shown in FIG. 7(*c*), the cooled mixed flakes were placed on a second sieve (8) having a hole diameter (d) of 12.5 mm and filtered, and the aggregated label flakes (10*b*) remaining on the second sieve (8) were collected and weighed.

Clumping ratio (%)=weight of aggregated mixed flakes/weight of initial mixed flakes×100

Test Example 6: Heat Shrinkage Rate

Figure 8:
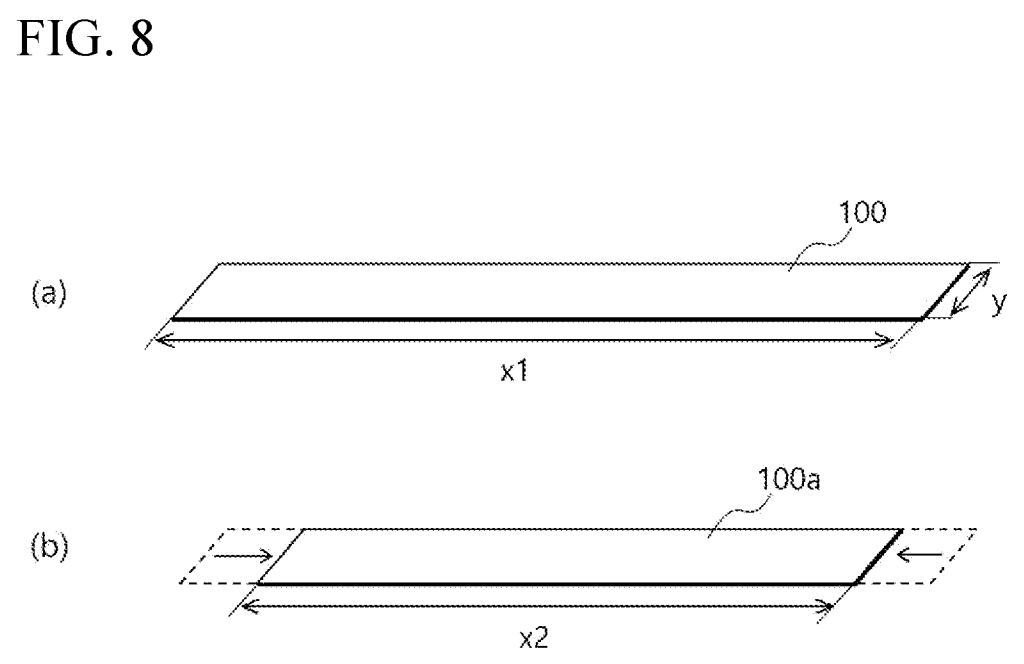

FIG. 8 shows a method of measuring the shrinkage of a polyester film. Referring to FIG. 8, the polyester film (100) was cut to have an initial dimension (x1) of 300 mm in the direction to be measured and a dimension (y) of 15 mm in the direction perpendicular thereto. It was immersed in a heated water bath for 10 seconds, and the shrunk dimension (x2) of the polyester film (100*a*) was measured and calculated according to the following equation. The shrinkage rate (%) in this test example was obtained in the main shrinkage direction (TD) of the film.

Shrinkage rate $(\%)=(x1-x2)/x1\times100$

The results of the above test examples are shown in Table 3 below.

TABLE 3

| | TD shrinkage (%) | | | | Solvent adhesion (gf/in) | | Clumping ratio (%) |
| --- | --- | --- | --- | --- | --- | --- | --- |
| | 70° C. | 80° C. | 90° C. | 100° C. | Before coating | After coating | |
| Ex. 1 | 51 | 79 | 80 | 80 | 2845 | 1800 | 0.6 |
| Ex. 2 | 51 | 78 | 79 | 80 | 1796 | 1560 | 0.6 |
| Ex. 3 | 51 | 77 | 78 | 79 | 1245 | 1210 | 0.4 |
| Ex. 4 | 50 | 74 | 76 | 77 | 1098 | 914 | 0.8 |
| C. Ex. 1 | 50 | 72 | 75 | 75 | 1021 | 345 | 0.9 |
| C. Ex. 2 | 30 | 70 | 73 | 74 | 812 | 311 | 0.7 |
| C. Ex. 3 | 25 | 67 | 70 | 72 | 607 | 275 | 0.6 |
| C. Ex. 4 | 34 | 69 | 77 | 78 | 1345 | 1187 | 18.4 |
| C. Ex. 5 | 37 | 71 | 73 | 77 | 1276 | 1123 | 19 |

As can be seen from Table 3, in the films of Examples 1 to 4, the shrinkage rate in the main shrinkage direction with respect to temperature, the solvent adhesion, and the clumping ratio were all within the preferred ranges.

The invention claimed is:

1. A polyester film, which comprises a polyester resin in which a diol comprising ethylene glycol and diethylene glycol; and a dicarboxylic acid are copolymerized, wherein the difference between the crystallization temperature (Tc) and the melting temperature (Tm) measured by a differential scanning calorimeter (DSC) is 100° C. or less, and the film has an endothermic peak at 100° C. to 150° C. when measured with a differential scanning calorimeter (DSC) upon treatment with a 1% aqueous solution of NaOH at 85° C. for 15 minutes, wherein the polyester film has a difference in reversible heat capacity ($\Delta C0p$) of 0.25 J/g·K or more before and after the glass transition temperature (Tg) as measured when it is subjected to first scan by a differential scanning calorimeter (DSC) from room temperature to 300° C. at a temperature elevation rate of 3° C./minute, followed by cooling thereof, and to second scan under the same conditions, wherein the polyester film has a shrinkage ratio of 74 to 80% in a transverse direction (TD) when heat-treated at a temperature of 80° C. for 10 seconds, and wherein the difference between the endothermic peak temperature and the melting temperature is 50° C. to 90° C.

2. The polyester film of claim 1, wherein the difference between the endothermic peak temperature and the melting temperature is 75° C. to 85° C.

3. The polyester film of claim 1, wherein the difference between the crystallization temperature (Tc) and the melting temperature (Tm) measured by a differential scanning calorimeter (DSC) is 65° C. to 100° C.

4. The polyester film of claim 1, wherein the difference between the difference ($\Delta Cp$) in reversible heat capacity before and after the glass transition temperature (Tg) measured through the first scan and the difference ($\Delta C0p$) in reversible heat capacity before and after the glass transition temperature (Tg) measured through the second scan is 0.01 J/g·K to 0.3 J/g·K.

5. The polyester film of claim 1, wherein the polyester film has a maximum peak at a diffraction angle (2θ) of less than 25° in an X-ray diffraction (XRD) spectrum.

6. The polyester film of claim 1, wherein the polyester film has a shrinkage rate of 60% to 80% in the main shrinkage direction upon thermal treatment at a temperature of 100° C. for 10 seconds.

7. The polyester film of claim 1, wherein, when one sheet of the polyester film is coated with a glycol-based solution and is then adhered with another sheet of the polyester film by 1,3-dioxolane, the peel strength is 500 gf/in or more.

8. The polyester film of claim 1, wherein, when the polyester film is crushed to a particle size of 9.5 mm to 12 mm, thermally treated at a temperature of 210° C. under a load of 2.5 kgf for 90 minutes, and passed through a sieve having a hole size of 12.5 mm, the ratio that does not pass may be 5% or less.

9. The polyester film of claim 1, wherein the diol further comprises at least one comonomer selected from neopentyl glycol and cyclohexanedimethanol in an amount of 20% by mole to 30% by mole.

10. The polyester film of claim 1, wherein the diol further comprises neopentyl glycol in an amount of 20% by mole to 40% by mole.

11. The polyester film of claim 1, wherein the diol comprises the diethylene glycol in an amount of 1% by mole to 5% by mole.

12. A heat shrinkable label, which comprises the polyester film of claim 1.

13. A heat shrinkable packaging material, which comprises the polyester film of claim 1.

\* \* \* \* \*